US009674738B2

(12) United States Patent
Gao et al.

(10) Patent No.: US 9,674,738 B2
(45) Date of Patent: Jun. 6, 2017

(54) METHOD AND DEVICE FOR MAINTAINING NEIGHBOR INFORMATION OF MOBILE RELAY

(71) Applicant: ZTE Corporation, Shenzhen (CN)

(72) Inventors: Yin Gao, Shenzhen (CN); Feng Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/647,917

(22) PCT Filed: Aug. 16, 2013

(86) PCT No.: PCT/CN2013/081671
§ 371 (c)(1),
(2) Date: May 28, 2015

(87) PCT Pub. No.: WO2014/082473
PCT Pub. Date: Jun. 5, 2014

(65) Prior Publication Data
US 2015/0304905 A1 Oct. 22, 2015

(30) Foreign Application Priority Data
Nov. 29, 2012 (CN) .......................... 2012 1 0498973

(51) Int. Cl.
*H04B 7/15* (2006.01)
*H04B 7/14* (2006.01)
(Continued)

(52) U.S. Cl.
CPC ... *H04W 36/0061* (2013.01); *H04W 36/0083* (2013.01); *H04W 24/02* (2013.01);
(Continued)

(58) Field of Classification Search
USPC .......................................... 455/11.1, 16, 9, 7
See application file for complete search history.

(56) References Cited

U.S. PATENT DOCUMENTS 9,065,533 B2 * 6/2015 Teyeb ..................... H04B 7/155
9,225,449 B2 * 12/2015 Heo ..................... H04W 76/048
(Continued)

FOREIGN PATENT DOCUMENTS

CN 101626565 A 1/2010
CN 102083125 A 6/2011
(Continued)

OTHER PUBLICATIONS

International Search Report for corresponding application PCT/PCT/CN2013/081671 filed Aug. 16, 2013; Mail date Nov. 21, 2013.
(Continued)

*Primary Examiner* — Tilahun B Gesesse
(74) *Attorney, Agent, or Firm* — Cantor Colburn LLP (57) ABSTRACT

A maintenance method and device for neighbor information of a mobile relay are provided. The above-mentioned method includes: neighbor relation information is acquired when the MR resides in a designated station, wherein the neighbor relation information includes: information about a cell to which one or more user equipment (UE) dominated by the MR can be migrated; and a neighbor list of the MR is maintained according to the neighbor relation information. By using the above-mentioned technical solution provided in the disclosure, the technical problems that, in the related art, there is not yet a solution for the MR to achieve the automatic generation and optimization of neighbor cells in a mobile environment (such as high-speed rail environment) etc. are solved, thereby enabling the UE of the MR to
(Continued)

be quickly migrated to an appropriate neighbor cell, optimizing the MR switching process and the network performance.

18 Claims, 4 Drawing Sheets

(51) Int. Cl.
    *H04B 17/02*     (2006.01)
    *H04W 36/00*     (2009.01)
    *H04W 36/32*     (2009.01)
    *H04W 84/00*     (2009.01)
    *H04W 24/02*     (2009.01)
    *H04W 84/04*     (2009.01)

(52) U.S. Cl.
    CPC .......... *H04W 36/32* (2013.01); *H04W 84/005* (2013.01); *H04W 84/047* (2013.01)

(56) References Cited

U.S. PATENT DOCUMENTS

| | | | |
|---|---|---|---|
| 2008/0062906 A1 | 3/2008 | Baker et al. | |
| 2012/0329461 A1* | 12/2012 | Teyeb | H04W 36/0061 455/437 |
| 2013/0039185 A1* | 2/2013 | Teyeb | H04B 7/155 370/235 |
| 2013/0044639 A1 | 2/2013 | Wang et al. | |
| 2013/0130682 A1* | 5/2013 | Awad | H04W 48/20 455/434 |
| 2013/0308481 A1* | 11/2013 | Kazmi | H04W 24/02 370/252 |
| 2014/0004859 A1* | 1/2014 | Drury | H04W 36/0083 455/436 |
| 2014/0071856 A1* | 3/2014 | Brisebois | H04W 56/00 370/255 |
| 2014/0192781 A1* | 7/2014 | Teyeb | H04W 36/34 370/331 |

FOREIGN PATENT DOCUMENTS

| | | |
|---|---|---|
| EP | 2101519 A1 | 9/2009 |
| WO | 2010056072 A2 | 5/2010 |
| WO | 2011142579 A2 | 11/2011 |
| WO | 2012158085 A1 | 11/2012 |

OTHER PUBLICATIONS

Supplementary European Search Report for corresponding application PCT/CN2013/081671 filed Aug. 16, 2013; Mail date Nov. 26, 2015.

* cited by examiner

FIG.1 neighbor relation information is acquired when the MR resides in a designated station, wherein the neighbor relation information includes: information about a cell to which a UE dominated by the MR can be migrated — S202 a neighbor list of the MR is maintained according to the neighbor relation information — S204

METHOD AND DEVICE FOR MAINTAINING NEIGHBOR INFORMATION OF MOBILE RELAY

TECHNICAL FIELD

The embodiments of the disclosure relates to the field of communication, and in particular, to a method and device for maintaining neighbor information of a mobile relay (MR).

BACKGROUND

In order to keep the third generation mobile communication system to be competitive in the communication field, the 3rd Generation Partnership Project (3GPP) standard working group is working on the research of the Evolved Packet System (EPS). The entire EPS system mainly includes two parts: an Evolved Universal Terrestrial Radio Access Network (E-UTRAN) and an Evolved Packet Core (EPC). The EPC of the system can support the access of a user from a Global System for Mobile communication (GSM) system/Enhanced Data Rate for GSM Evolution (EDGE) Radio Access Network (GERAN) and a Universal Terrestrial Radio Access Network (UTRAN).

An EPC packet core network contains a Home Subscriber Server (HSS), a Mobility Management Entity (MME), a Serving Gateway (S-GW), a PDN Gateway (P-GW), a Serving GPRS Support Node (SGSN) and a Policy and Charging Enforcement Function (PCRF), wherein:

the HSS is a permanent storage site of user subscription data and is located in a home network subscribed by the user;

the MME is a storage site of the user subscription data in a current network and is responsible for signalling management from a terminal to a network non-access stratum (NAS), the tracking and paging management function in a user idle mode and bearer management;

the S-GW is a gateway between a core network and a radio system and is responsible for user plane bearer from a terminal to the core network, data cache in a terminal idle mode, the function of a network side initiating a service request, lawful interception, and packet data routing and forwarding function;

the P-GW is a gateway between an evolved packet domain system and an external network of the system and is responsible for functions such as IP address allocation of a terminal, charging function, packet filtering and policy application;

the SGSN is a service supporting point for users of GERAN and UTRAN to access an EPC network, which is similar to the MME in function. It is responsible for functions such as the update of user's location, paging management and bearer management; and the PCRF is responsible for providing policy control and charging rules to a Policy and Charging Enforcement Function (PCEF).

Figure 1:
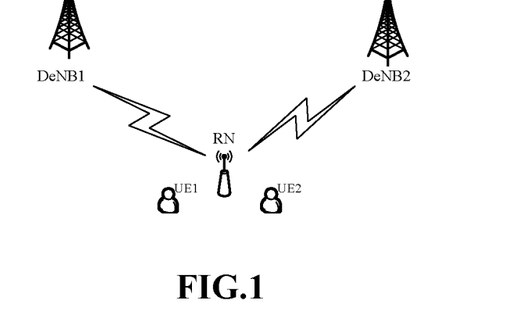
FIG. 1 is a schematic diagram of a mobile relay deployment scenario according to the related art.

In some scenarios, the concept of relay node is introduced in order to enlarge the radio coverage range or temporarily increase the capability of wirelessly providing access users. The schematic diagram of the network architecture is as shown in FIG. 1, and the description of network elements is provided as follows:

A Relay Node (RN) contains two parts of functions, User Equipment (UE) and a relay node. The RN on the one hand serves as a UE to access the network and performs operations such as bearer establishment, and on the other hand serves as an E-UTRAN NodeB (eNB) to provide access for the UE.

The Donor eNodeB (DeNB) provides radio access for the RN, ends a radio resource control (RRC) signalling of the RN-UE and ends an S1 AP signalling and an X2 signalling of the RN-eNB. The SGW and PGW of the RN-UE are built in the DeNB.

The Relay Node Operator and Management (RN OAM) system is used for the RN to acquire necessary connection information therefrom.

The main purpose for the operator to deploy the architecture is to enlarge the coverage range of a base station by deploying relay nodes in some places where it is inconvenient to deploy wire connections, for example, in a remote underdeveloped region or an unexpected big conference or match. Moreover, in such a scenario, the location of a relay node is generally fixed. However, with the application of the relay node, the operators consider applying this technology to a broader scenario. For example, on a high speed railway, since a train is moving in a high speed, a large amount of wire communication facilities need to be deployed along the lines of the train, and this greatly increases the deployment cost for the operators. The radio link between a relay node and a donor eNodeB can just reduce this cost, and is thus popular with the operators. Such a device is called a mobile relay. See FIG. 1. Particular properties of a high-speed train scenario are as follows:

The train is moving at a high speed, such as 350 km/h; (an European Eurostar train has a length of 393 meters and a speed of 300 km/h; a Japanese Shinkansen has a length of 480 meters and a speed of 300 km/h; and a Chinese high-speed train has a length of 432 meters and a speed of 350 km/h);

running along a fixed line;

the signal penetration loss of a train carriage is high; and the users on the train are in a static state relative to the train or moving at a walking speed.

The particularity of the current MR usage scenario is considered, that is, usage on a high-speed train. The implementation of automatic neighbor optimization by an MR can be considered from the following aspects:

Since the MR only serves high-speed train users, in the train running process, a source DeNB has certain switching target cells with regard to the MR; and in the train running process, the users under the MR are relatively static and also do not need separate switching, and thus it can be considered that, in the train running process, the MR does not need to execute Automatic Neighbor Relation (ANR) measurement when being taken as a UE and also does not needs to maintain a Neighbor Relation Table (NRT) when being taken as an eNB. Here, the ANR mainly considers the condition where the MR is taken as an eNB. Thus, for the MR, only when the train reaches the station and stops, there exists the demand that the users under the MR need to migrate to an external macro cell, and therefore user migration needs to be implemented relying on the neighbor relations.

The difference from the Long-Term Evolution (LTE) ANR: ANR measurement of an MR only needs starting at specific moments, while the LTE ANR measurement has no starting limitation. During the train running process, no NRT table needs to be saved and maintained on the MR, that is to say, the ANR function is not needed. There is no effective solution for an MR in a mobile environment (for example, a high-speed train running environment) to achieve the automatic generation and optimization of neighbor cells.

Therefore, in a scenario of mobile relay node deployment in a mobile environment (a high-speed train environment), how to ensure the implementation of automatic generation and optimization of neighbor cells by mobile relays is a problem needing to be solved.

For the above-mentioned problem in the related art, no effective solution has been provided.

SUMMARY

For the technical problems in the related art that there is not yet a solution for the MR to achieve the automatic generation and optimization of neighbor cells in a mobile environment (such as high-speed train environment) etc., the embodiments of the disclosure provide a method and device for maintaining neighbor information of a mobile relay so as to at least solve the above-mentioned problem.

According to one embodiment of the disclosure, provided is a method for maintaining neighbor information of an MR, which method is applied to the MR and includes: neighbor relation information is acquired when the MR resides in a designated station, wherein the neighbor relation information includes: information about a cell to which one or more user equipment (UE) dominated by the MR can be migrated; and a neighbor list of the MR is maintained according to the neighbor relation information.

In the described embodiment, the neighbor relation information is acquired when the MR resides in the designated station includes: first neighbor relation information which is sent from a donor eNodeB (DeNB) associated with the designated station is received;

In the described embodiment, the neighbor relation information sent from the DeNB associated with the designated station is received by the following way: the neighbor relation information is received via an X2 interface message between the MR and the DeNB or via an S1 interface message.

In the described embodiment, the neighbor relation information is acquired when the MR resides in a designated station includes: the DeNB associated with the designated station is accessed; the one or more UEs are informed to start an ANR measurement process; and neighbor information is acquired through the ANR measurement process, and the neighbor relation information is determined according to the neighbor information.

In the described embodiment, informing the one or more UEs to start an ANR measurement process includes: the one or more UEs are informed to start the ANR measurement process by means of a downlink dedicated message, wherein the downlink dedicated message carries instruction information for instructing the UE to start the ANR measurement process.

In the described embodiment, when the neighbor list is inter-LTE/inter-frequency neighbor relation information, the downlink dedicated message further carries target LTE system or frequency band information which needs to be measured.

In the described embodiment, the neighbor list of the MR is maintained according to the acquired neighbor relation information includes one of the following: a neighbor list of the MR is established according to the acquired neighbor relation information; or an existing neighbor list of the MR is updated according to the acquired neighbor relation information.

In the described embodiment, the neighbor list includes one of the following: intra-long term evolution (LTE)/intra-frequency neighbor relation information, or inter-LTE/inter-frequency neighbor relation information.

In the described embodiment, the neighbor relation information is acquired when the MR is moving and residing in the designated station includes: first neighbor relation information which is sent from the donor eNodeB (DeNB) associated with the designated station is received; the DeNB associated with the designated station is accessed; the one or more UEs are informed to start an ANR measurement process; and the neighbor information is acquired through the ANR measurement process, and second neighbor relation information is determined according to the neighbor information; and the neighbor list of the mobile relay is maintained according to the acquired neighbor relation information includes: an initial neighbor list is established according to the first neighbor relation information; and the initial neighbor list is improved or updated according to the second neighbor relation information.

In the described embodiment, the above-mentioned method further includes: when the MR moves to a next station of the designated station, the acquisition of the neighbor relation information is stopped.

According to another embodiment of the disclosure, provided is a device for maintaining neighbor information of an MR, which device is applied to the MR and includes: an acquisition component is configured to acquire neighbor relation information when the MR resides in a designated station, wherein the neighbor relation information is information about a cell to which one or more UEs dominated by the MR can be migrated; and a maintenance component is configured to maintain a neighbor list of the MR according to the neighbor relation information.

In the described embodiment, the acquisition component includes: a first receiving unit is configured to receive the neighbor relation information which is sent from a donor eNodeB (DeNB) associated with the designated station.

In the described embodiment, the acquisition component includes: a first access unit is configured to access the DeNB associated with the designated station; a first informing unit is configured to inform the one or more UEs to start an ANR measurement process; and a first acquisition unit is configured to acquire neighbor information through the ANR measurement process, and determining the neighbor relation information according to the neighbor information.

In the described embodiment, the above-mentioned maintenance component includes: a first maintenance unit is configured to establish the neighbor list of the MR according to the acquired neighbor relation information; or update an existing neighbor list of the MR according to the acquired neighbor relation information.

In the described embodiment, the acquisition component includes: a second receiving unit is configured to receive first neighbor relation information which is sent from a donor eNodeB (DeNB) associated with the designated station; a second access unit is configured to access the DeNB associated with the designated station; a second informing unit is configured to inform the one or more UEs to start an ANR measurement process; and a second acquisition unit is configured to acquire neighbor information through the ANR measurement process, and determining second neighbor relation information according to the neighbor information; and the maintenance component includes: an establishment unit configured to establish an initial neighbor list according to the first neighbor relation information; and a second maintenance unit configured to improve or update the initial neighbor list according to the second neighbor relation information.

By means of the embodiments of the disclosure, the technical means of maintaining a neighbor list of an MR according to acquired neighbor relation information when the MR resides in a designated station, the technical problems in the related art that there is not yet a solution for the MR to achieve the automatic generation and optimization of neighbor cells in a mobile environment (such as high-speed train environment) etc., are solved, so that the one or more UEs under the MR can be quickly migrated to an appropriate neighbor cell, thereby optimizing the MR switching process and the network performance.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

In view of the technical problems in the related art that there is not yet a solution for the MR to achieve the automatic generation and optimization of neighbor cells in a mobile environment (such as high-speed train environment) etc., relevant solutions are provided below in combination with embodiments, which will now be described in detail.

Embodiment 1

Figure 2:
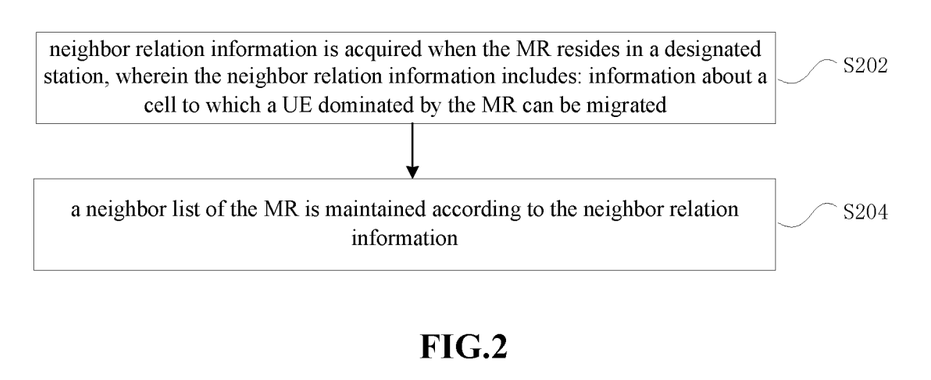
FIG. 2 is a flowchart of a method for maintaining neighbor information of an MR according to embodiment 1 of the disclosure.

FIG. 2 is a flowchart of a method for maintaining neighbor information of an MR according to embodiment 1 of the disclosure. The method is applied to an MR, comprising:

step S202, neighbor relation information is acquired when the MR resides in a designated station, wherein the neighbor relation information includes: information about a cell to which a UE dominated by the MR can be migrated; and step S204, a neighbor list of the MR is maintained according to the neighbor relation information.

By means of the above-mentioned processing steps, since the MR will acquire the above-mentioned neighbor relation information when residing in the station, and maintain the neighbor list of the MR according to the neighbor relation information, the MR can achieve the automatic generation and optimization.

In step S202, there are a plurality methods to acquire the above-mentioned neighbor relation information, for example, the information can be preset in the MR and triggered to be valid when the MR arrives at the above-mentioned designated station. In the present embodiment, this can also be implemented by the following methods:

The First Method

After having arrived at the designated station and resided, the DeNB sends the neighbor relation information to the MR, in other words, the MR will receive the neighbor relation information sent from the DeNB associated with the above-mentioned designated station. When the method is used, the neighbor relation information can be received by means of an X2 interface message between the MR and the DeNB or via an S1 interface message. In the particular application, the above-mentioned processing steps can be the following implementation process:

When the MR moves to a station, a DeNB at the location of the station (i.e. the DeNB associated with the station) transmits neighbor cell information (i.e. the neighbor relation information) for the MR via a terrestrial interface. When there exists an X2 interface between the MR and the DeNB, then the DeNB can transmit the local neighbor information to the MR via an X2 interface message, for example, an X2 establishment request, a response message and a base station configuration update message. When there is no X2 interface between the MR and the DeNB, the DeNB now can perform the transmission via an S1 interface.

The Second Method

In the method, the UE needs to be informed to start ANR measurement so as to acquire the above-mentioned neighbor relation information, and in particular, the neighbor relation information is acquired when the MR resides in the designated station can be implemented by the steps of:

(1) the MR accesses the DeNB associated with the designated station;

(2) the UE is informed to start an automatic neighbor relation (ANR) measurement process; and (3) the neighbor information is acquired through the ANR measurement process, and the neighbor relation information is determined according to the neighbor information.

In the implementation process of the method, the UE can be informed to start the ANR measurement process by a downlink dedicated message, wherein the downlink dedicated message carries instruction information for instructing the UE to start the ANR measurement process.

In the implementation process of the method, when the neighbor list is inter-LTE/inter-frequency neighbor relation information, the downlink dedicated message also carries target LTE system or frequency band information which needs to be measured.

The implementation process of the method is a UE-based solution which can be expressed by the following processing processes during the particular implementation:

(1) Intra-LTE/Intra-Frequency Neighbor Cell Automatic Generation and Optimization Since a table is temporarily established and the territoriality is strong, the process can be performed under the direction of the DeNB. For example, when the train reaches the station, and the MR switches to the station DeNB, attributes configuration can be set on the station DeNB to make it clear that the DeNB is a station-related DeNB. The MR can acquire the attributes configuration information such as identifier information about the station DeNB when acquiring a DeNB list from an MR OAM; and when the MR accesses the DeNB, the MR informs the one or more UEs to start the ANR measurement and processing. That is, the MR informs the one or more UEs to perform measurement by a downlink dedicated message at an air interface, wherein the message carries instruction information, for example, opening the ANR measurement; and the UE sends a measurement result relevant to cell B. This result contains a cell physical identifier (Phy-CID, referred to as PCI) of the cell B instead of a global identifier (Global-CID, referred to as GCI);

when receiving a measurement report containing the Phy-CID sent from the one or more UEs, the MR will execute the following processing steps:

the MR informs the one or more UEs, and uses the newly-discovered Phy-CID as a parameter to read a Global-CID, a tracking area code (TAC) and all of the available public land mobile network (PLMN) IDs of a relevant neighbor cell; and when the one or more UEs acquires the Global-CID of the neighbor cell, the one or more UEs reports same to an MR of a serving cell; and the MR decides to access the neighbor relation and can use the Phy-CID and Global-CID as well as other information reported by the one or more UEs to update an intra-system/intra-frequency neighbor list.

(2) Inter-RAT/Inter-Frequency Neighbor Cell Automatic Generation and Optimization Since a table is temporarily established and the territoriality is strong, and since Inter-RAT/inter-frequency measurement is performed, the process needs to be performed under the direction of the DeNB. For example, when the trains reaches the station, the MR switches to the station DeNB, and attributes configuration can be arranged on the station DeNB to make it clear that the DeNB is a station-related DeNB. The MR can acquire the attributes configuration information such as identifier information about the station DeNB when acquiring a DeNB list from an MR OAM.

A) After accessing the DeNB, the MR can inform the one or more UEs to start the ANR measurement and processing. That is, the MR informs the one or more UEs to perform measurement by means of a downlink dedicated message at an air interface, wherein the message not only contains instruction information, for example, opening the ANR measurement, but also contains target system/frequency band measurement information needing to be measured.

B) The one or more UEs report the Phy-CID of a cell in a detected target system/frequency band.

When receiving the cell Phy-CID reported by the one or more UEs, the MR will execute the steps of:

C) The MR informs the one or more UEs and uses the newly-discovered Phy-CID as a parameter to read the Global-CID of the detected target system, or the Global-CID, TAC and all the available PLMN IDs of the detected target frequency band. Therefore, the MR needs to schedule an appropriate idle period to have the one or more UEs read the Global-CID via a broadcast channel of the detected neighbor cell.

D) After reading the Global-CID of the detected target system, or the Global-CID, TAC and all the available PLMN IDs of the detected target frequency band, the one or more UEs report same to the MR of the serving cell.

The MR decides to access the neighbor relation and can use the Phy-CID and Global-CID as well as other information reported by the one or more UEs to update an inter-system/inter-frequency neighbor list.

In the present embodiment, the term "maintain" in step S204 may include two meanings which are establishing and updating, specifically, step S204 may include one of the following processing processes: the neighbor list of the MR is established according to the acquired neighbor relation information; or an existing neighbor list of the MR is updated according to the acquired neighbor relation information.

In the present embodiment, the above-mentioned neighbor list may include one of the following: intra-LTE/intra-frequency neighbor relation information, or inter-LTE/inter-frequency neighbor relation information.

The Third Method

The method is equivalent to a solution combining the first method and the second method, that is, firstly, an initial neighbor cell list is established by utilizing the first method, and then the initial neighbor cell list is improved or updated by utilizing the second method, and the method is specifically:

neighbor relation information is acquired when the MR is moving and residing in the designated station can be implemented in the following processing process: first neighbor relation information which is sent from the DeNB associated with the designated station is received; the DeNB associated with the designated station is accessed; the one or more UEs are informed to start an ANR measurement process; and the neighbor information is acquired through the ANR measurement process, and second neighbor relation information is determined according to the neighbor information; and the step that the neighbor list of the mobile relay is maintained according to the acquired neighbor relation information can be implemented in the following processing process: an initial neighbor list is established according to the first neighbor relation information; and the initial neighbor list is improved or updated according to the second neighbor relation information.

In the present embodiment, when the MR moves to a next station of the designated station, the acquisition of the neighbor relation information is stopped. In the particular implementation process, the above-mentioned processing steps can be in the following implementation form:

After the ANR is started, when the MR moves to a next DeNB of the station DeNB, the ANR automatically stops and the local NRT table is cleared. The one or more UEs can be informed by a downlink dedicated message, for example, the message carries a stop instruction, and measurement reconfiguration can also be performed by an RRC reconfiguration message, for example, only the signal quality of a serving cell is measured.

Figure 3:
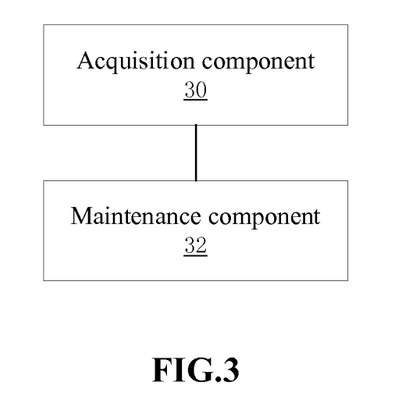
FIG. 3 is a structural block diagram of a device for maintaining neighbor information of an MR according to embodiment 1 of the disclosure.

In the present embodiment, further provided is a device for maintaining neighbor information of an MR, and the device is applied to the MR and is used for implementing the above-mentioned embodiments and preferred embodiments, which have been described and need not be described redundantly. The components involved in the device are described below. As used below, terms or "component" is a combination of software and/or hardware which can implement a predetermined function. Although the device described in the following embodiments is preferably implemented with software, implementations using hardware or combinations of software and hardware are also possible and can be conceived. FIG. 3 is a structural block diagram of a device for maintaining neighbor information of an MR according to embodiment 1 of the disclosure. As shown in FIG. 3, the device includes:

an acquisition component 30 which is connected to a maintenance component 32 and is configured to acquire neighbor relation information when the MR resides in a designated station, wherein the neighbor relation information is information about a cell to which one or more UEs dominated by the MR can be migrated; and the maintenance component 32 is configured to maintain a neighbor list of the MR according to the above-mentioned neighbor relation information.

By means of the functions implemented by the above-mentioned components, the MR can also be enabled to acquire the above-mentioned neighbor relation information when residing in the station and maintain the neighbor list of the MR according to the neighbor relation information, and therefore the device can also enable the MR to achieve the automatic generation and optimization.

Figure 4:
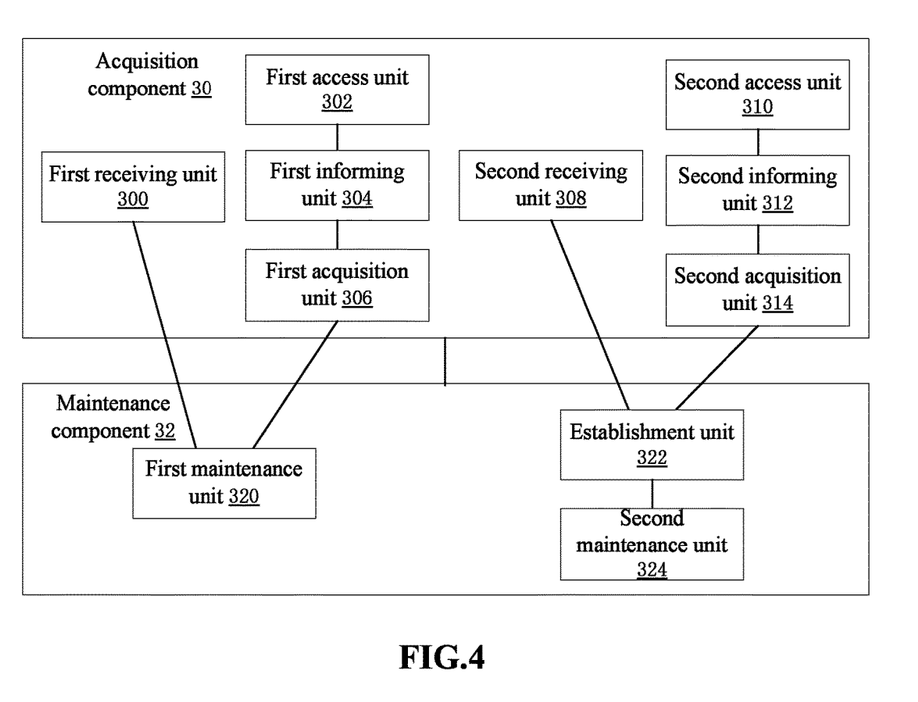
FIG. 4 is another structural block diagram of a device for maintaining neighbor information of an MR according to embodiment 1 of the disclosure.

In the present embodiment, as shown in FIG. 4, the above-mentioned acquisition component may include: a first receiving unit 300 is configured to receive the neighbor relation information which is sent from a DeNB associated with the designated station.

In the present embodiment, as shown in FIG. 4, the above-mentioned acquisition component may also include: a first access unit 302 is connected to a first informing unit 304 and is configured to access the DeNB associated with the designated station; the first informing unit 304 is connected to a first acquisition unit 306 and is configured to inform the one or more UEs to start an ANR measurement process; and the first acquisition unit 306 is configured to acquire the neighbor information through the ANR measurement process and determine second neighbor relation information according to the neighbor information.

In the present embodiment, as shown in FIG. 4, the above-mentioned maintenance component 32 includes:

a first maintenance unit 320 is configured to establish a neighbor list of the mobile relay according to the acquired neighbor relation information; or update the existing neighbor list of the mobile relay according to the acquired neighbor relation information.

In the present embodiment, as shown in FIG. 4, the above-mentioned acquisition component 30 may also includes:

a second receiving unit 308 is configured to receive first neighbor relation information which is sent from the DeNB associated with the designated station;

a second access unit 310 is connected to a second informing unit 312 and is configured to access the DeNB associated with the designated station;

the second informing unit 312 is connected to a second acquisition unit 314 and is configured to inform the one or more UEs to start an ANR measurement process; and the second acquisition unit 314 is configured to acquire the second neighbor relation information through the ANR measurement process; and the maintenance component 32 may also include:

an establishment unit 322 which is connected to a second maintenance unit 324, is configured to establish an initial neighbor list according to the first neighbor relation information; and the second maintenance unit 324 is configured to improve or update the initial neighbor list according to the second neighbor relation information.

For a better understanding of the above-mentioned embodiment, detailed description is provided below in combination with embodiments 2-5 and relevant drawings. The solutions described in the following embodiments are based on the following characteristics of the MR ANR: the NRT table is temporary, and the table is required to be established rapidly; the NRT table has a strong territoriality and the NR for each station is different; and the ANR needs to be performed under the direction of the network side.

Embodiment 2

The purpose of the present embodiment is to achieve the automatic generation and optimization of a neighbor cell after an MR reaches a station by a solution based on a network side or a solution based on UE report or a hybrid solution in a high-speed train scenario, so that users under the MR could rapidly and effectively migrate to an appropriate neighbor cell, and the electricity consumption of the UE can be reduced as much as possible, thereby achieving the optimization of the switching of the mobile relay and the improvement of the network performance.

The method for maintaining neighbor information of an MR provided in the present embodiment can achieve the automatic generation and optimization of the neighbor cell of the MR according to a method of an interface transmission or air interface report, which contributes to the optimization of network performance and improvement of user satisfaction.

Figure 5:
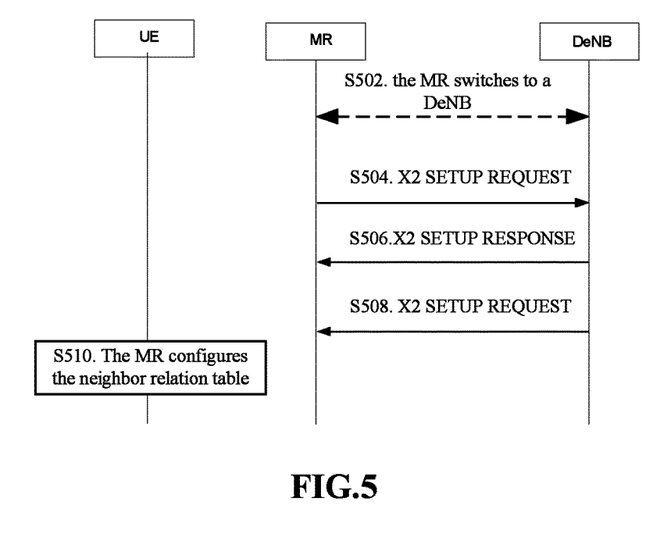
FIG. 5 is a flowchart of a method for maintaining neighbor information of an MR according to embodiment 2 of the disclosure.

To achieve the above-mentioned purposes, the technical solution adopted in the present embodiment is as follows:

It is assumed that an X2 interface exists between the MR and the DeNB, as shown in FIG. 5, the method includes the following processing steps:

step S502: when the MR moves to a station, that is, the MR switches to a DeNB at the location of the station, the DeNB transmits neighbor cell information for the MR via the X2 interface, which can be implemented by an X2 interface establishment process message or an eNB configuration update message, and if it is the former, step S504 is proceeded to; and if it is the latter, step S508 is proceeded to;

step S504: the MR sends an X2 interface establishment request to the DeNB;

step S506: the DeNB sends an X2 interface establishment response to the MR, and carries information about all the serving cells under the DeNB in the response;

step S508: the DeNB sends an eNB configuration update message to the MR via an X2 establishment request message, and carries information about all the serving cells under the DeNB in the message; and step S510: after having received the X2 interface message, the MR may selectively configure a serving cell in the response message to be its own neighbor cell in such as way as interaction with an OAM, which can be constrained according to a neighbor cell black-and-white table.

Furthermore, if there is no X2 interface exists between the MR and the station DeNB, then the process can be implemented via an S1 interface.

It is assumed that the migrations of UEs under the MR to other base stations all need to be transitioned via the cell of the DeNB, then the neighbor cell relations saved on the MR only need to keep consistent with the DeNB.

If the assumption is invalid, then the users (i.e. UE) under the MR directly migrate to eNB cells outside the DeNB or migrate to an external eNB via a serving cell of the DeNB. Generally, the coverage area of the DeNB at the station region may certainly contain a moving range after the UE leaves away from the MR. Note that the cells of the DeNB here are not necessarily configured to be neighbor cells of the cell of the MR, thus the solutions of embodiments 3-5 need to be adopted.

Embodiment 3

Figure 6:
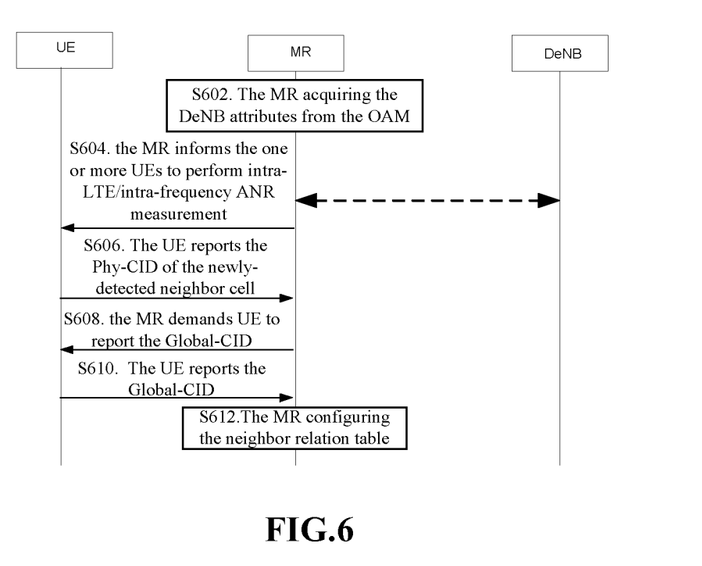
FIG. 6 is a flowchart of a method for maintaining neighbor information of an MR according to embodiment 3 of the disclosure.

In the present embodiment, the solution is intra-LTE/intra-frequency neighbor cell automatic generation and optimization based on UE report, and as shown in FIG. 6, the method includes:

Step S602: since a table is temporarily established and the territoriality is strong, the process can be performed under the direction of the DeNB. The advantage of this is that the UE does not need to perform extra measurement and report during the train running and the electric consumption of the UE is saved, because the UE will move together with the MR and will not migrate to an external eNB during the train running. For example, when the train reaches the station, the MR switches to the station DeNB, and attributes configuration may be set on the station DeNB to make it clear that the DeNB is a station-related DeNB. The MR may acquire the attributes configuration information such as identifier information about the station DeNB when the MR acquires a DeNB list from an MR OAM.

Step S604: after the MR accesses the DeNB, the MR informs the UE to start the ANR measurement and processing. That is, the MR informs the UE to perform measurement by a downlink dedicated message at an air interface, wherein the message carries instruction information, for example, opening the ANR measurement; and Step S606: the UE sends a measurement result relevant to cell B. This result contains a cell physical identifier (Phy-CID) of the cell B instead of a Global-CID.

Step S608: when the MR receives a measurement report containing the Phy-CID and sent from the UE, the MR informs the UE that the UE uses the newly-discovered Phy-CID as a parameter to acquire a Global-CID, a TAC (tracking area code) and all the available PLMN IDs of a relevant neighbor cell. Therefore, the MR needs to schedule an appropriate idle period to make the UE acquire the Global-CID of the detected neighbor cell.

Step S610: when the UE acquires the Global-CID of the neighbor cell, the UE reports same to the MR of the serving cell. When it is needed by the MR, the UE will also report the TAC and all the PLMN IDs of the detected neighbor cell.

Step S612, the MR decides to add the neighbor relation and may use the Phy-CID and Global-CID as well as other information reported by the UE to update an intra-system/intra-frequency neighbor list.

Embodiment 4

Figure 7:
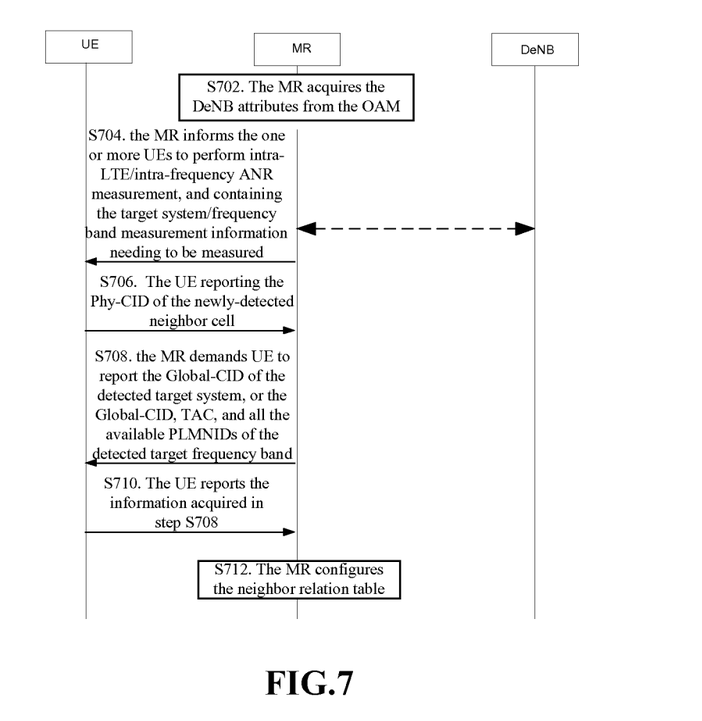
FIG. 7 is a flowchart of a method for maintaining neighbor information of an MR according to embodiment 4 of the disclosure.

In the present embodiment, the solution is inter-RAT/inter-frequency neighbor cell automatic generation and optimization based on UE report. As shown in FIG. 7, the method for maintaining neighbor information of an MR provided in the present embodiment includes the following processing steps:

Step S702: since a table is temporarily established and the territoriality is strong, the process can be performed under the direction of the DeNB. The advantage of this is that the UE does not need to perform extra measurement and report during the train running and the electric consumption of the UE is saved, because the UE will move together with the MR and will not migrate to an external eNB during the train running. For example, when the train reaches the station, the MR switches to the station DeNB, and attributes configuration may be set on the station DeNB to make it clear that the DeNB is a station-related DeNB. The MR may acquire the attributes configuration information such as identifier information about the station DeNB when the MR acquires a DeNB list from an MR OAM.

Step S704: after accessing the DeNB, the MR can inform the UE to start the ANR measurement and processing. That is, the MR informs the UE to perform measurement by a downlink dedicated message at an air interface, wherein the message not only contains instruction information, for example, opening the ANR measurement, but also contains target system/frequency band measurement information needing to be measured. The MR informs the UE to measure neighbor cells in a target system/frequency band. Therefore, the MR needs to schedule an appropriate idle period to make the UE detect available cells in the target system/frequency band.

Step S706: the UE sends a measurement result relevant to cell B. This result contains a cell physical identifier (Phy-CID) of the cell B. The Phy-CID is defined by the following parameters: when it is in a UTRAN frequency division duplexing (FDD) cell, a carrier frequency and a primary scrambling code (PSC) are adopted; when it is in a UTRAN time division duplexing (TDD) cell, a carrier frequency and a cell parameter ID are adopted; when it is in a GERAN cell, an ARFCN (Absolute Radio Frequency Channel Number) of a base station identity code (BSIC) and a broadcast control channel (BCCH) are adopted; and when it is in a CDMA200 cell, a PN Offset is adopted.

Step S708: when the MR receives a measurement report containing the Phy-CID and sent from the UE, the MR informs the UE and uses the newly-discovered Phy-CID as a parameter to acquire the Global-CID of the detected target system, or the Global-CID, TAC, and all the available PLMN IDs of the detected target frequency band. If it is a GERAN cell, a common gateway interface (CGI), a relative address coding (RAC) are read; if it is a UTRAN cell, a CGI, a location area code (LAC) and an RAC are read; and if it is a CDMA2000 cell, a CGI is read. With regard to an LTE inter-frequency cell, then a ECGI, a TAC and all the PLMN IDs are included. Therefore, the eNodeB needs to schedule an appropriate idle period to make the UE acquire the Global-CID via a broadcast channel of the detected neighbor cell.

Step S710: after the UE acquires the information of step S708, the UE reports same to the MR of the serving cell.

Step S712: the MR decides to add the neighbor relation and may use the Phy-CID and Global-CID as well as other information reported by the UE to update an intra-system/intra-frequency neighbor list.

Embodiment 5

Figure 8:
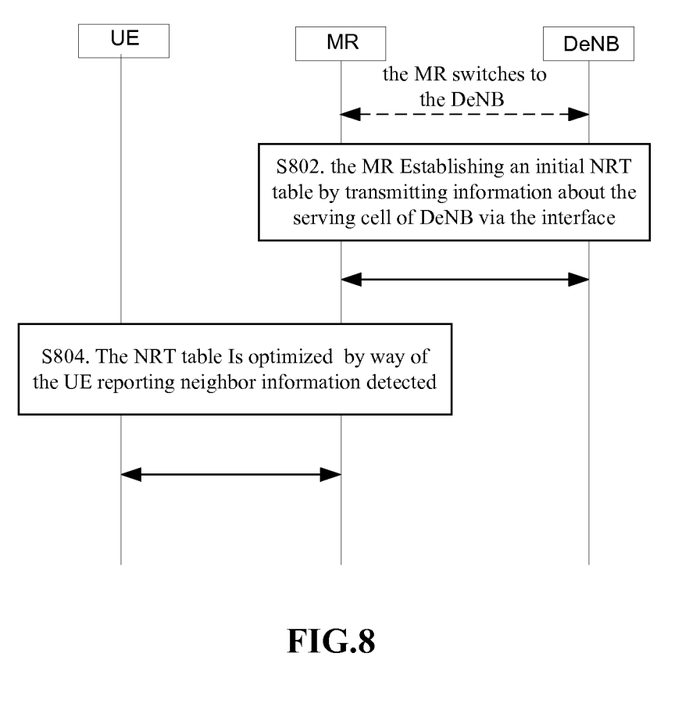
FIG. 8 is a flowchart of a method for maintaining neighbor information of an MR according to embodiment 5 of the disclosure.

As shown in FIG. 8, the method for maintaining neighbor information of an MR provided in the present embodiment includes the following processing steps:

Step S802: after accessing the DeNB of the station, the MR establishes an initial NRT table utilizing the solution of embodiment 2.

Step S804: the NRT table is improved by UE report utilizing the solutions of embodiments 3 and 4.

It should be noted that, in embodiments 2-5, after the ANR is started, when the MR moves to a next DeNB of the station DeNB, the ANR automatically stops and the local NRT table is cleared. The UE needs to be informed by a downlink dedicated message, for example, the message carrying a stop instruction, and measurement reconfiguration may also be performed by an RRC reconfiguration message, for example, only measuring the signal quality of a serving cell.

In another embodiment, also provided is a software, wherein the software is used for executing the technical solutions described in the above-mentioned embodiments and preferred embodiments.

In another embodiment, also provided is a storage medium, wherein the storage medium stores the above-mentioned software, and the storage medium includes, but is not limited to: an optical disk, a floppy disk, a hard disk, an erasable memory, etc.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

The invention claimed is:

1. A method for maintaining neighbor information of a mobile relay, MR, which is applied to the MR and comprising:
   acquiring, by the MR, neighbor relation information when the MR resides in a designated station, wherein the neighbor relation information comprises: information about a cell to which one or more user equipment, UEs, dominated by the MR can be migrated; and
   maintaining, by the MR, a neighbor list of the MR according to the neighbor relation information, wherein acquiring, by the MR, the neighbor relation information when the MR resides in the designated station comprises: receiving, by the MR, first neighbor relation information which is sent from a DeNB associated with the designated station; accessing, by the MR, the DeNB associated with the designated station; informing, by the MR, the one or more UEs to start an ANR measurement process; and acquiring, by the MR, the neighbor information through the ANR measurement process, and determining, by the MR, second neighbor relation information according to the neighbor information; and
   maintaining, by the MR, the neighbor list of the MR according to the acquired neighbor relation information comprises: establishing, by the MR, an initial neighbor list according to the first neighbor relation information; and improving or updating, by the MR, the initial neighbor list according to the second neighbor relation information.

2. The method according to claim 1, wherein acquiring, by the MR, neighbor relation information when the MR resides in the designated station comprises:
   receiving, by the MR, the neighbor relation information sent from a donor eNodeB, DeNB, associated with the designated station.

3. The method according to claim 2, wherein the neighbor relation information sent from the DeNB associated with the designated station is received by the following way:
   receiving, by the MR, the neighbor relation information via an X2 interface message between the MR and the DeNB or via an S1 interface message.

4. The method according to claim 3, wherein maintaining, by the MR, the neighbor list of the MR according to the acquired neighbor relation information comprises one of the following:
   establishing, by the MR, the neighbor list of the MR according to the acquired neighbor relation information; or
   updating, by the MR, an existing neighbor list of the MR according to the acquired neighbor relation information.

5. The method according to claim 3, wherein the neighbor list comprises one of the following:
   intra-LTE/intra-frequency neighbor relation information, or inter-LTE/inter-frequency neighbor relation information.

6. The method according to claim 2, wherein the neighbor list comprises one of the following:
   intra-LTE/intra-frequency neighbor relation information, or inter-LTE/inter-frequency neighbor relation information.

7. The method according to claim 2, wherein maintaining, by the MR, the neighbor list of the MR according to the acquired neighbor relation information comprises one of the following:
   establishing, by the MR, the neighbor list of the MR according to the acquired neighbor relation information; or
   updating, by the MR, an existing neighbor list of the MR according to the acquired neighbor relation information.

8. The method according to claim 2, wherein the method further comprises:
   when the MR moves to a next station of the designated station, stopping, by the MR, acquiring the neighbor relation information.

9. The method according to claim 1, wherein acquiring, by the MR, the neighbor relation information when the MR resides in the designated station comprises:
   accessing, by the MR, the DeNB associated with the designated station;
   informing, by the MR, the one or more UEs to start an automatic neighbor relation, ANR measurement process; and
   acquiring, by the MR, neighbor information through the ANR measurement process, and determining the neighbor relation information according to the neighbor information.

10. The method according to claim 9, wherein informing, by the MR, the one or more UEs to start the ANR measurement process comprises:
    informing, by the MR, the one or more UEs to start the ANR measurement process by a downlink dedicated message, wherein the downlink dedicated message carries instruction information for instructing the one or more UEs to start the ANR measurement process.

11. The method according to claim 10, wherein,
when the neighbor list is inter-LTE or inter-frequency neighbor relation information, the downlink dedicated message further carries target LTE system or frequency band information which needs to be measured.

12. The method according to claim 9, wherein maintaining, by the MR, the neighbor list of the MR according to the acquired neighbor relation information comprises one of the following:
establishing, by the MR, the neighbor list of the MR according to the acquired neighbor relation information; or
updating, by the MR, an existing neighbor list of the MR according to the acquired neighbor relation information.

13. The method according to claim 1, wherein the neighbor list comprises one of the following:
intra-LTE/intra-frequency neighbor relation information, or inter-LTE/inter-frequency neighbor relation information.

14. The method according to claim 1, wherein the method further comprises:
when the MR moves to a next station of the designated station, stopping, by the MR, acquiring the neighbor relation information.

15. A device for maintaining neighbor information of a mobile relay, MR, which is applied to the MR and comprising:
a hardware processor, configured to perform programming components stored in a memory, wherein the programming components comprise:
an acquisition component configured to acquire neighbor relation information when the MR resides in a designated station, wherein the neighbor relation information is information about a cell to which one or more user equipment, UEs dominated by the MR can be migrated; and
a maintenance component configured to maintain a neighbor list of the MR according to the neighbor relation information, wherein the acquisition component comprises: a second receiving unit configured to receive first neighbor relation information which is sent from a donor eNodeB, DeNB, associated with the designated station; a second access unit configured to access the DeNB associated with the designated station; a second informing unit configured to inform the one or more UEs to start an ANR measurement process; and a second acquisition unit configured to acquire neighbor information through the ANR measurement process, and determining second neighbor relation information according to the neighbor information; and the maintenance component comprises: an establishment unit configured to establish an initial neighbor list according to the first neighbor relation information; and a second maintenance unit configured to improve or update the initial neighbor list according to the second neighbor relation information.

16. The device according to claim 15, wherein the acquisition component comprises:
a first receiving unit configured to receive the neighbor relation information which is sent from a donor eNodeB, DeNB, associated with the designated station.

17. The device according to claim 16, wherein the maintenance component comprises:
a first maintenance unit configured to establish the neighbor list of the MR according to the acquired neighbor relation information; or update an existing neighbor list of the MR according to the acquired neighbor relation information.

18. The device according to claim 15, wherein the acquisition component comprises:
a first access unit configured to access the DeNB associated with the designated station;
a first informing unit configured to inform the one or more UEs to start an automatic neighbor relation, ANR, measurement process; and
a first acquisition unit configured to acquire neighbor information through the ANR measurement process, and determining the neighbor relation information according to the neighbor information.

* * * * *